(12) United States Patent
Ogawa

(10) Patent No.: US 11,647,145 B2
(45) Date of Patent: May 9, 2023

(54) INFORMATION PROCESSING APPARATUS AND CONTROL METHOD

(71) Applicant: SHARP KABUSHIKI KAISHA, Sakai (JP)

(72) Inventor: Akira Ogawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/578,245

(22) Filed: Jan. 18, 2022

(65) Prior Publication Data

US 2022/0232143 A1 Jul. 21, 2022

(30) Foreign Application Priority Data

Jan. 21, 2021 (JP) .............................. JP2021-008063

(51) Int. Cl.
*H04N 1/44* (2006.01)
*H04N 1/00* (2006.01)
(52) U.S. Cl.
CPC ......... *H04N 1/4446* (2013.01); *H04N 1/0097* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,736,223 B2* | 8/2017 | Akimoto | H04N 1/4433 |
| 2014/0082137 A1* | 3/2014 | Matoba | H04L 67/02 |
| | | | 709/217 |
| 2017/0078499 A1* | 3/2017 | Hoshino | H04N 1/00204 |

FOREIGN PATENT DOCUMENTS

JP    2010-273030 A    12/2010

\* cited by examiner

*Primary Examiner* — Frantz Bataille
(74) *Attorney, Agent, or Firm* — ScienBiziP, P.C.

(57) ABSTRACT

An information processing apparatus includes a controller that executes a job including a destination in a setting value, a storage, and a display. The storage stores destination information including the destination, and setting history information that includes the setting value and is history information pertaining to execution of the job. The controller reads the setting history information from the storage, and displays the setting history information on the display when the destination included in the setting history information is stored in the storage.

11 Claims, 17 Drawing Sheets

FIG. 3

| ID | DESTINATION NAME | E-mail ADDRESS | FAX NUMBER | SCANNER ADDRESS |
|---|---|---|---|---|
| 1 | ICHIRO TANAKA | tanaka.ichiro@aabbcc.co.jp | | |
| 2 | HANAKO TANAKA | tanaka.hanako@aabbcc.co.jp | | |
| 3 | JIRO TANAKA | | 1234567890 | |
| 4 | SHIRO TANAKA | | | 123.456.789.123 |

FIG. 4

| JID | EXECUTION DATE AND TIME | MODE | OUTPUT DESTINATION | STORAGE DESTINATION | SETTING VALUE |
|---|---|---|---|---|---|
| 1 | 2020/01/06 10:00 | COPY | PAPER FEED TRAY 1 | | COLOR MODE: AUTOMATIC/BLACK AND WHITE BINARY RESOLUTION: 200 × 200 dpi · · · |
| 2 | 2020/01/07 15:00 | E-mail TRANSMISSION | | | COLOR MODE: AUTOMATIC/BLACK AND WHITE BINARY RESOLUTION: 300 × 300 dpi · · · DESTINATION: tanaka.ichiro@aabbcc.co.jp |
| 3 | 2020/01/07 15:30 | E-mail TRANSMISSION | | | COLOR MODE: AUTOMATIC/GRAY SCALE RESOLUTION: 200 × 200 dpi · · · DESTINATION: tanaka.jiro@aabbcc.co.jp |
| 4 | 2020/01/09 09:30 | SCAN STORAGE | | STANDARD FOLDER | COLOR MODE: FULL COLOR RESOLUTION: 400 × 400 dpi · · · |
| 5 | 2020/01/12 16:00 | FAX TRANSMISSION | | | DENSITY: AUTOMATIC IMAGE QUALITY: DETAILS · · · DESTINATION: 1234567890 |

SETTING HISTORY

2020/01/06 10:00 COPY: PAPER FEED TRAY 1
COLOR MODE: AUTOMATIC/BLACK AND WHITE BINARY  RESOLUTION: 200 x 200 dpi ···

2020/01/07 15:00 E-mail TRANSMISSION: tanaka.ichiro@aabbcc.co.jp
COLOR MODE: AUTOMATIC/BLACK AND WHITE BINARY  RESOLUTION: 300 x 300 dpi ···

2020/01/07 15:30 E-mail TRANSMISSION: ****jiro@****co.jp
COLOR MODE: AUTOMATIC/BLACK AND WHITE BINARY  RESOLUTION: 300 x 300 dpi ···

2020/01/09 09:30 SCAN STORAGE: STANDARD FOLDER
COLOR MODE: FULL COLOR  RESOLUTION: 400 x 400 dpi ···

2020/01/12 16:00 FAX TRANSMISSION: 1234567890
DENSITY: AUTOMATIC IMAGE QUALITY: DETAILS ···

FIG. 13B

SETTING HISTORY

DO YOU WANT TO NEWLY EXECUTE JOB BY USING SELECTED SETTING HISTORY?

[YES] [NO]

FIG. 13C

SIMPLE FAX | SIMPLE SCAN   UNDER COMMUNICATION  PRINTER   JOB STATUS

DESTINATION — TOUCH TO INPUT DESTINATION

SUBJECT NAME
FILE NAME — FOLLOW SYSTEM SETTING

COLOR MODE: AUTOMATIC/BLACK AND WHITE BINARY
RESOLUTION: 300x300dpi
FORMAT: PDF
DOCUMENT
DENSITY: AUTOMATIC

DESTINATION LIST
NEXT DESTINATION
OTHER ITEM

READING SIZE: AUTOMATIC 100%
TRANSMISSION SIZE: AUTOMATIC

DESTINATION LIST
TRANSMISSION HISTORY
CALL BY SEARCH NUMBER
REGISTER PROGRAM
TRANSMIT LINK OF STORAGE DESTINATION
TRANSMIT BY SAME IMAGE AS FAX DESTINATION

[PREVIEW] [RESET]
[START]

OTHER FUNCTION

FIG. 15A

SETTING HISTORY    tanaka.jiro@aabbcc.co.jp

2020/01/06 10:00 COPY: PAPER FEED TRAY 1
 COLOR MODE: AUTOMATIC/BLACK AND WHITE BINARY RESOLUTION:200 x 200 dpi ···

2020/01/07 15:00 E-mail TRANSMISSION:tanaka.ichiro@aabbcc.co.jp
 COLOR MODE: AUTOMATIC/BLACK AND WHITE BINARY RESOLUTION:300 x 300 dpi ···

2020/01/09 09:30 SCAN STORAGE: STANDARD FOLDER
 COLOR MODE: FULL COLOR RESOLUTION:400 x 400 dpi ···

2020/01/12 16:00 FAX TRANSMISSION: 1234567890
 DENSITY: AUTOMATIC IMAGE QUALITY: DETAILS ···

FIG. 15B

SETTING HISTORY    tanaka.jiro@aabbcc.co.jp

2020/01/07 15:00 E-mail TRANSMISSION:tanaka.ichiro@aabbcc.co.jp
 COLOR MODE: AUTOMATIC/BLACK AND WHITE BINARY RESOLUTION:300 x 300 dpi ···

FIG. 15C

DESTINATION

SIMPLE FAX | SIMPLE SCAN | UNDER COMMUNICATION | PRINTER | JOB STATUS tanaka.jiro@aabbcc.co.jp

SUBJECT NAME
FILE NAME — FOLLOW SYSTEM SETTING

COLOR MODE — AUTOMATIC/GRAY SCALE
RESOLUTION — 200x200dpi
FORMAT — PDF
DOCUMENT
DENSITY — AUTOMATIC
OTHER FUNCTION

DESTINATION LIST
OTHER ITEM
NEXT DESTINATION

READING SIZE — AUTOMATIC 100%
TRANSMISSION SIZE — AUTOMATIC

DESTINATION LIST
TRANSMISSION HISTORY
CALL BY SEARCH NUMBER
REGISTER PROGRAM
TRANSMIT LINK OF STORAGE DESTINATION
TRANSMIT BY SAME IMAGE AS FAX DESTINATION

PREVIEW | RESET | START

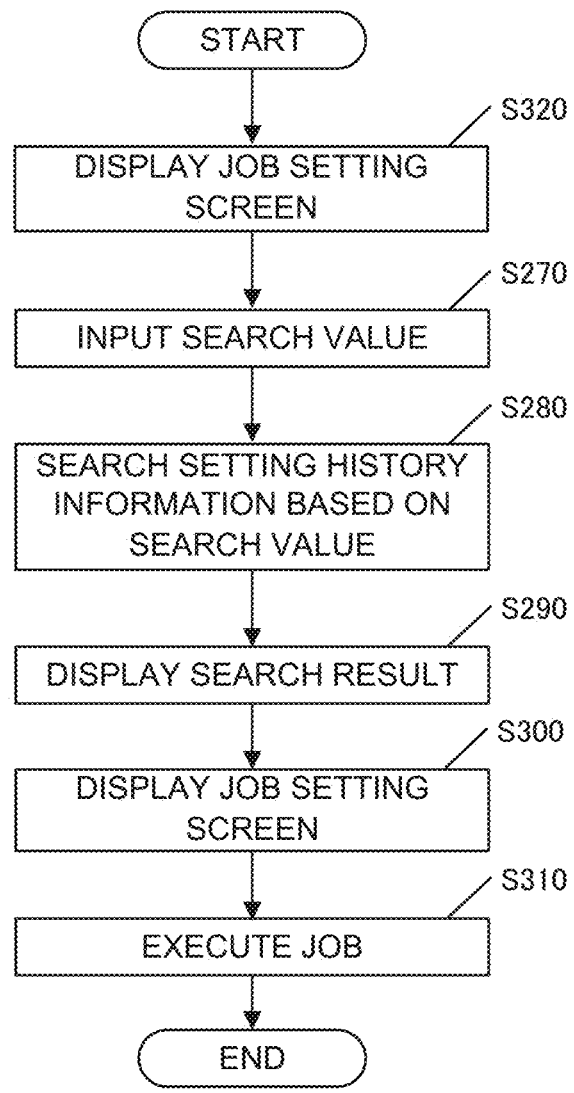

INFORMATION PROCESSING APPARATUS AND CONTROL METHOD

BACKGROUND OF THE INVENTION

Field of the Invention

The present invention relates to an information processing apparatus and the like.

Description of the Background Art

For example, there is known an information processing apparatus that stores, as setting history information, a setting value pertaining to a job, after the job based on each function such as fax transmission, e-mail transmission, copying, scanning, or data storage is executed.

In order to facilitate execution of a job that is the same as or similar to a job pertaining to setting history information, there is an information processing apparatus that presents the setting history information to a user. The user selects presented setting history information, changes the setting value if necessary, and inputs an execution instruction. The information processing apparatus executes various job functions, based on setting history information, thereby enabling the user to easily acquire a job execution result.

Generally, in a situation where no authentication processing is performed for a specific user, and a large number of users can share and use information, setting history information pertaining to a job executed by the information processing apparatus is in a browsable state to a large number of users. In this case, for example, information about a destination (hereinafter, referred to as destination information) such as a destination number pertaining to fax transmission, and an e-mail address pertaining to e-mail transmission is also in a browsable state to a large number of users. These pieces of destination information correspond to personal information. Therefore, it is not desirable from a viewpoint of security that the destination information is leaked to the outside against a user's intention.

In order to prevent leakage of destination information to the outside, for example, apparatuses are known in which a destination is hidden in displaying setting history information, or display of setting history information is restricted. However, these apparatuses are designed to handle all setting histories recorded by the apparatus itself. Since display restriction is imposed on all pieces of setting history information, it could not be said that the apparatus has a practical function in terms of confirmation/reuse of setting history information.

For example, Japanese Unexamined Patent Application Publication No. 2010-273030 describes that a data communication apparatus in which communication histories of many users are displayed in a mixed manner is provided with a reading disable means that encrypts an item of a communication history designated by each user in an unreadable manner. In the technique described in Japanese Unexamined Patent Application Publication No. 2010-273030, since an item of a communication history that the user wants to hide is displayed in an encrypted manner, it is said that reading of the item by a third party can be prevented.

However, in the technique of Japanese Unexamined Patent Application Publication No. 2010-273030, it is necessary to acquire and store an ID, a password, a PIN, and the like in order to use the encryption function. Also, in the technique of Japanese Unexamined Patent Application Publication No. 2010-273030, it is necessary to perform an encryption operation for each fax transmission (job execution). In addition, in the technique of Japanese Unexamined Patent Application Publication No. 2010-273030, since an "encryption guide" is displayed for each fax transmission to encourage encryption, it is necessary to respond even to a job that does not require encryption.

An object of the present disclosure is to provide an information processing apparatus and the like capable of preventing destination information from being leaked to the outside against an intention of a user, without requiring a special operation to the user regarding use of setting history information.

SUMMARY OF THE INVENTION

To solve the above problem, an information processing apparatus according to the present disclosure includes a controller that executes a job including a destination in a setting value, a storage, and a display. The storage stores destination information including the destination, and setting history information that includes the setting value and is history information pertaining to execution of the job. The controller reads the setting history information from the storage, and displays the setting history information on the display when the destination included in the setting history information is stored in the storage.

Also, a control method according to the present disclosure is a control method for controlling an information processing apparatus provided with a controller that executes a job including a destination in a setting value, a storage, and a display. The method includes: storing, in the storage, destination information including the destination, and setting history information that includes the setting value and is history information pertaining to execution of the job; and reading the setting history information from the storage, and displaying the setting history information on the display when the destination included in the setting history information is stored in the storage.

According to the present disclosure, it is possible to provide an information processing apparatus and the like capable of preventing destination information from being leaked to the outside against an intention of a user, without requiring a special operation to the user regarding use of setting history information.

BRIEF DESCRIPTION OF THE DRAWINGS

FIG. 3 is a diagram illustrating a configuration example of an address book.

FIG. 4 is a table illustrating a configuration example of setting history information.

FIGS. 10A to 10C are diagrams illustrating an operation example according to the second embodiment.

FIGS. 13A to 13C are diagrams illustrating an operation example according to the third embodiment.

FIGS. 15A to 15C are diagrams illustrating an operation example according to the fourth embodiment.

FIG. 16 is a flowchart illustrating a flow of processing according to a fifth embodiment.

DESCRIPTION OF THE PREFERRED EMBODIMENTS

In the following, embodiments according to the present disclosure are described with reference to the drawings. Note that, in description of the embodiments, a multifunction machine that has functions such as fax transmission, e-mail transmission, copying, scanning, or data storage, and executes a job based on each of the functions is described as an example of an information processing apparatus. Also, the following embodiments are an example for explaining the present disclosure, and the technical scope of the description described in the claims is not limited to the following description.

1. First Embodiment

A multifunction machine according to the first embodiment determines whether a destination included in setting history information is private by referring to/comparing with an address book as destination information provided in itself. When an address book of a multifunction machine is released to a user, it is conceivable that a destination registered in the address book is personal information that imposes no security problem even when the destination is disclosed to a large number of unspecified persons. Therefore, it is possible to determine whether a destination included in setting history information is private, specifically, a destination to be protected by depending on a registration status of the destination in the address book.

1.1 Functional Configuration

Figure 1:
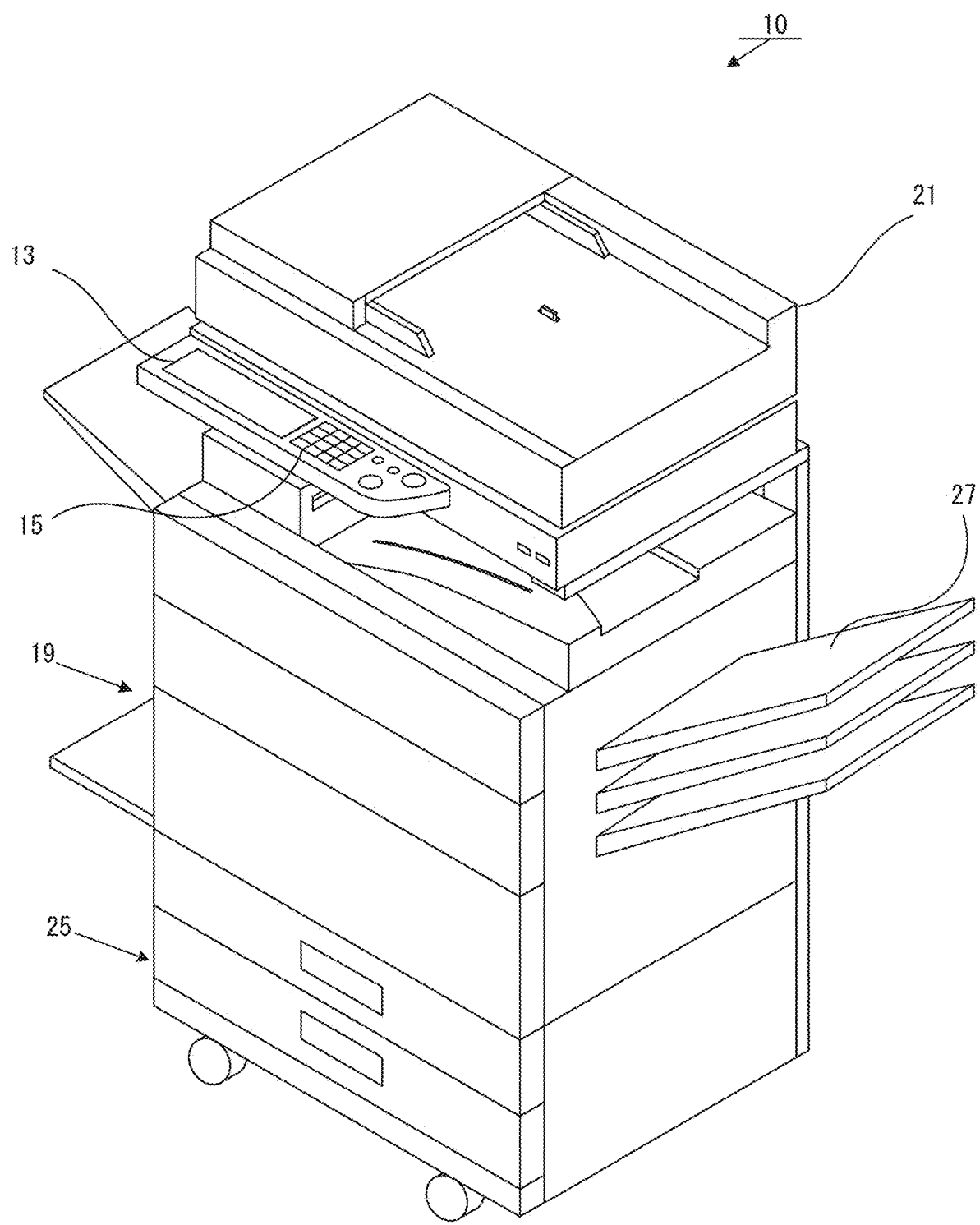
FIG. 1 is an external view of a multifunction machine according to a first embodiment.
Figure 2:
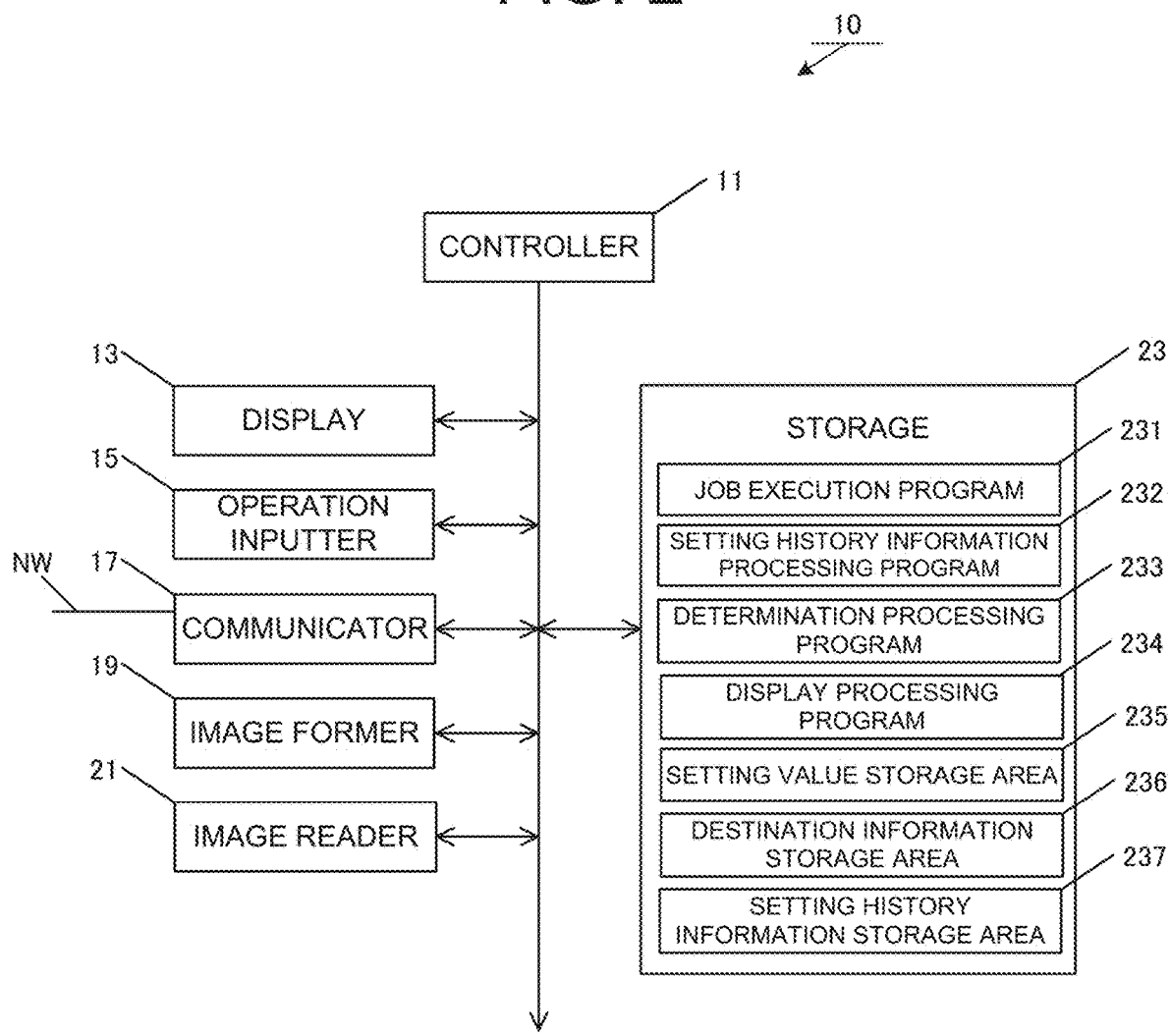
FIG. 2 is a functional configuration diagram of the multifunction machine according to the first embodiment.

A functional configuration of a multifunction machine 10 according to the first embodiment is described with reference to FIGS. 1 and 2. FIG. 1 is an external view illustrating an overall configuration of the multifunction machine 10. FIG. 2 is a functional configuration diagram of the multifunction machine 10.

As illustrated in FIGS. 1 and 2, the multifunction machine 10 includes a controller 11, a display 13, an operation inputter 15, a communicator 17, an image former 19, an image reader 21, a storage 23, a paper feeder 25, and a paper discharger 27.

The controller 11 controls the entirety of the multifunction machine 10. The controller 11 is constituted of, for example, one or more arithmetic devices (such as a central processing unit (CPU)). The controller 11 achieves its functions by reading and executing a job execution program 231, a setting history information processing program 232, a determination processing program 233, a display processing program 234, and the like stored in the storage 23.

The display 13 displays various types of information to a user and the like. The display 13 can be constituted of, for example, a liquid crystal display (LCD), an organic electro-luminescence (EL) display, or the like.

The operation inputter 15 accepts an input of information such as a setting value by a user and the like. The operation inputter 15 can be constituted of a hard key (e.g., a numeric keypad), a button, and the like. Note that, the operation inputter 15 can also be constituted as a touch panel that allows an input via the display 13. In this case, as an input detection method of a touch panel, for example, a method such as a resistive film method, an infrared method, an electromagnetic induction method, or an electrostatic capacitance method can be employed.

The communicator 17 is connected to another device via a network (NW) such as a local area network (LAN), a wide area network (WAN), the Internet, a general subscriber telephone line, and a facsimile communication network, and transmits various types of information such as image data and fax data, an e-mail, and the like. The communicator 17 is constituted, for example, as a communicable interface, and one or both of wired connection and wireless connection can be employed as a connection method.

The image former 19 forms an image based on image data on paper. The image former 19 feeds paper from the paper feeder 25, forms an image based on image data on the paper, and thereafter discharges the paper to the paper discharger 27. The image former 19 can be constituted of, for example, a laser printer using an electrophotographic method or the like. The image former 19 performs image formation by using toner supplied from unillustrated toner cartridges associated with toner colors (e.g., yellow (Y), magenta (M), cyan (C), and black (K)).

The image reader 21 generates scan data by reading an image to be read. The image reader 21 can be constituted of a scanner device or the like that converts an image into an electrical signal by an image sensor such as a charge coupled device (CCD) or a contact image sensor (CIS), and generates digital data by quantizing and encoding the electrical signal.

The paper feeder 25 has a tray for accommodating a plurality of sheets of paper in a loaded state. The tray can accommodate paper having various sizes and thicknesses depending on a purpose of use. The paper feeder 25 can be constituted of, for example, a plurality of trays that individually accommodate paper of different sizes such as A4 size, B5 size, and A3 size.

The paper discharger 27 is provided with a plate-shaped stacker that loads paper discharged outside of the apparatus after image formation. As illustrated in FIG. 1, a plurality of stackers may be provided at a plurality of locations in such a way that paper of different sizes can be discharged.

The storage 23 stores various programs necessary for an operation of the multifunction machine 10, and various pieces of data. The storage 23 can be constituted of, for example, a volatile memory such as a random access memory (RAM), a solid state drive (SSD) which is a semiconductor memory, or a non-volatile memory such as a hard disk drive (HDD) and a read only memory (ROM).

In the first embodiment, the storage 23 stores the job execution program 231, the setting history information processing program 232, the determination processing program 233, and the display processing program 234, and secures a setting value storage area 235, a destination information storage area 236, and a setting history information storage area 237.

The job execution program 231 is a program to be read by the controller 11 so as to perform processing accompanying execution of fax transmission, e-mail transmission, copying, scanning, a data storage function, or the like on the basis of a job. By reading the job execution program 231, the controller 11 controls each unit associated with execution of the job.

The setting history information processing program 232 is, for example, a program to be read by the controller 11, when various processing such as acquiring a setting value and the like pertaining to job execution, generating setting history information, and search processing with respect to setting history information are performed. By reading the setting history information processing program 232, the controller 11 acquires a setting value pertaining to job execution and stores the setting value in the setting value storage area 235. In addition, the controller 11 generates setting history information by using the acquired setting value, and stores the setting history information in the setting history information storage area 237.

The determination processing program 233 is a program to be read by the controller 11, when it is determined whether a destination pertaining to fax transmission or e-mail transmission as a setting value is included in setting history information. Also, when the destination is included, the controller 11 reads the program in determining whether an address book that matches the destination is present. By reading the determination processing program 233, the controller 11 determines whether a destination included in setting history information is private, specifically, a destination to be protected.

The display processing program 234 is a program to be read by the controller 11, when setting history information stored in the setting history information storage area 237 is read, and a setting history selection screen is presented to the user. Also, the controller 11 reads the display processing program 234, when setting history information is displayed or hidden, a job setting screen is displayed, and the like. The controller 11 can perform various display processing by reading the display processing program 234, and controlling the display 13.

The setting value storage area 235 is a storage area that stores various setting values pertaining to job execution. The setting values include a setting value set by a user in execution of each job, an apparatus initial value held by the apparatus itself, and the like. In addition, the setting value storage area 235 stores a destination of data transmission as a setting value, when an executed job is a job pertaining to data transmission such as fax transmission, e-mail transmission, or scan storage.

Note that, the setting value may be a value directly input by a user via the operation inputter 15, a touch panel displayed on the display 13, or the like. Also, when the multifunction machine 10 is connected to an unillustrated external terminal device or the like via the communicator 17, the controller 11 can also acquire a setting value input via a control program such as a printer driver introduced to the external terminal device. The controller 11 stores the acquired setting value in the setting value storage area 235.

The destination information storage area 236 is a storage area that stores, as an address book, destination information related to a destination, such as a destination number pertaining to fax transmission, and an e-mail address pertaining to e-mail transmission. For example, FIG. 3 is a diagram illustrating a configuration example of an address book according to the first embodiment. The address book is, for example, a set of information being destination information in which a destination name is associated with a destination number such as an e-mail address, a fax number, and a scanner address, and also an ID for uniquely identifying the information is attached. For example, "destination name: Ichiro Tanaka" illustrated in FIG. 3 is associated with "e-mail address: tanaka.ichiro@aabbcc.co.jp", and "ID: 1" is attached. Likewise, "destination name: Hanako Tanaka" is associated with "e-mail address: tanaka.hanako@aabbcc.co.jp", and "ID: 2" is attached. "Destination name: Jiro Tanaka" is associated with "fax number: 1234567890", and "ID: 3" is attached. In addition, "destination name: Shiro Tanaka" is associated with "scanner address: 123.456.789.123", and "ID: 4" is attached.

The address book stored in the destination information storage area 236 can be read at a time of data transmission such as fax transmission or e-mail transmission, and displayed as an unillustrated address book screen. The user can select a destination for data transmission by selecting a desired destination via a displayed address book screen.

Note that, FIG. 3 illustrates an example in which one destination number is associated with each destination name, but destination information is not limited to the above. Two destination numbers, for example, an e-mail address and a fax number, may be associated with a destination name, and there is no limitation on the number of destination numbers to be associated with a destination name. Note that, the address book can be constructed by automatically collecting e-mail addresses, fax numbers, scanner addresses, and the like according to a job executed for a destination indicated by a destination name. In addition, it is needless to say that a user who executes a job can directly input a destination number for a destination name via an input unit such as the operation inputter 15.

The setting history information storage area 237 is a storage area that stores setting history information in a data table format. For example, setting history information can be configured as history information in which a job ID (JID) for uniquely identifying information is attached to information constituted of combination of execution information pertaining to job execution such as an execution date and time of a job, a mode (job function), an output destination, and a storage destination; and a part or all of setting values stored in the setting value storage area 235 or setting values acquired via the operation inputter 15 or the like. Note that, setting history information according to the present disclosure includes, as a setting value, a destination of data transmission, when an executed job is a job pertaining to data transmission such as fax transmission or e-mail transmission.

FIG. 4 is a diagram illustrating a configuration example of setting history information according to the present disclosure. For example, the job ID: JID2 indicates that the job ID is setting history information pertaining to e-mail transmission. The job is a job executed on Jan. 7, 2020, at 15:00. The setting history information pertaining to the job ID: JID2 includes a setting value of the destination: tanaka.ichiro@aabbcc.co.jp, in addition to the color mode: automatic/black and white binary, resolution: 300×300 dpi . . . . Note that, as far as a setting value (item) included in setting history information is a setting value stored in the setting value storage area 235, the setting value is not specifically limited. Setting values other than the destination of data transmission illustrated in FIG. 4 are only an example, and setting values according to the present disclosure are not limited only to those illustrated in FIG. 4.

1.2 Flow of Processing

Figure 5:
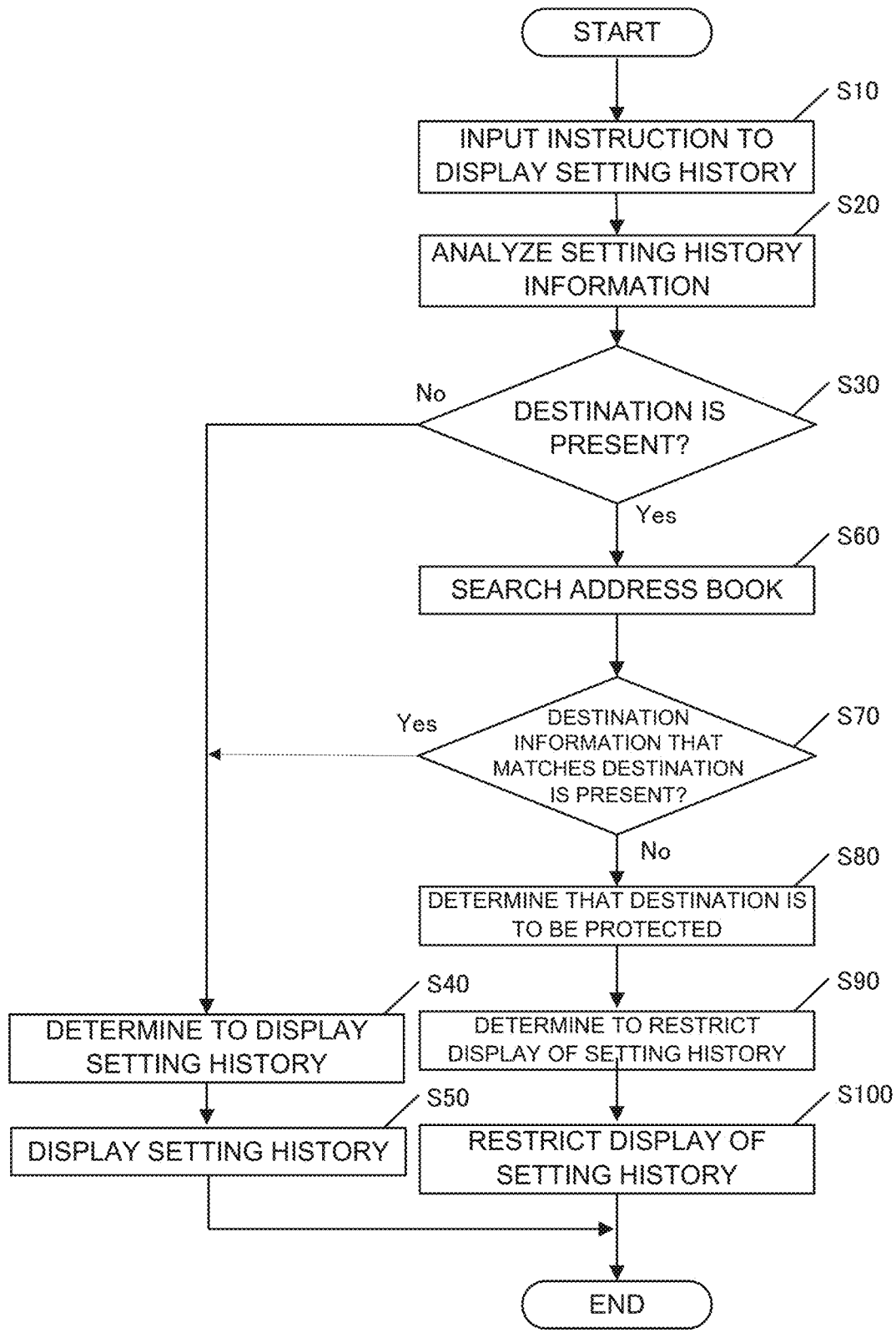
FIG. 5 is a flowchart illustrating a flow of processing according to the first embodiment.

1.2.1 Setting History Display Restriction Processing when Destination is Object to be Protected Setting history display restriction processing when a destination included in setting history information as a setting value is an object to be protected is first described with reference to a flowchart in FIG. 5. FIG. 5 is a flowchart illustrating processing on display of a setting history from a display instruction input of a setting history based on setting history information.

First, in response to a display instruction input of a setting history by the user (Step S10), the controller 11 reads the determination processing program 233, and analyzes setting history information stored in the setting history information storage area 237 (Step S20).

The controller 11 determines whether a destination pertaining to data transmission such as fax transmission or e-mail transmission is present in the setting history information (Step S30). When the controller 11 determines that the setting history information including the destination is not present (Step S30; No), the controller 11 determines that a setting history is to be displayed (Step S40). Then, the controller 11 reads the display processing program 234, displays the setting history on the display 13 (Step S50), and ends the processing.

On the other hand, when the controller determines that the setting history information including the destination is present (Step S30; Yes), the controller 11 performs a search of an address book stored in the destination information storage area 236 (Step S60).

As a result of the search of the address book, it is determined whether destination information that matches the destination is present (Step S70), and when the destination information is not present (Step S70; No), the controller 11 determines that the destination included in the setting history information is a destination to be made private, specifically, a destination to be protected (Step S80). Then, the controller 11 determines to restrict display of a setting history (Step S90).

When the controller 11 determines to restrict display of a setting history, the controller 11 reads the display processing program 234, and restricts display of the setting history (Step S100), and ends the processing.

Note that, as a result of the search of the address book (Step S60), when destination information that matches the destination is present (Step S70; Yes), the controller 11 determines that the destination included in the setting history information is a destination that is allowed to be made public, specifically, a destination that is not an object to be protected. Then, the controller 11 determines to display the setting history (Step S40). Then, the controller 11 reads the display processing program 234, and displays the setting history on the display 13 (Step S50), and ends the processing.

Figure 6:
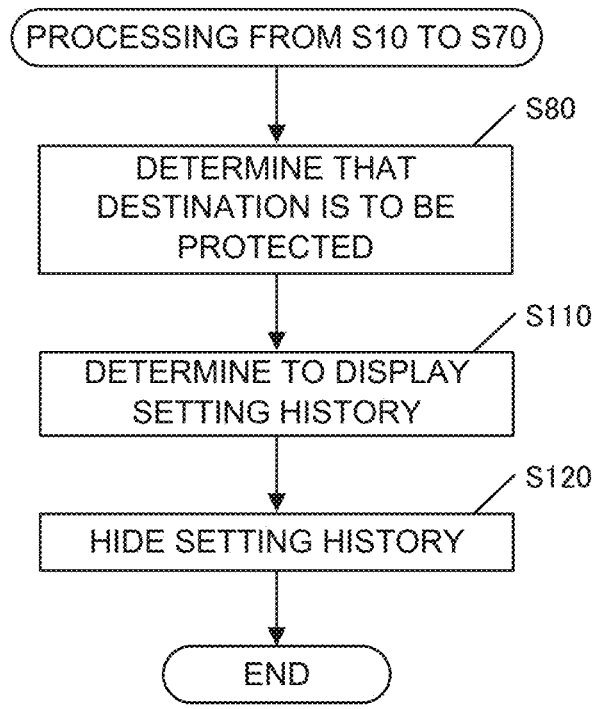
FIG. 6 is a flowchart illustrating a flow of processing according to the first embodiment.

1.2.2 Setting History Hiding Processing when Destination is Object to be Protected Next, setting history hiding processing when a destination included in setting history information as a setting value is an object to be protected is described with reference to a flowchart in FIG. 6. FIG. 6 illustrates processing of Step S80 and thereafter in FIG. 5. Since the processing from Step S10 to Step S70 is identical to the processing of the flowchart in FIG. 5, description thereof is omitted herein.

When the controller 11 determines that the destination included in the setting history information is a destination to be made private, specifically, a destination to be protected (Step S80), the controller 11 determines that a part of a setting history is to be displayed (Step S110). Then, the controller reads the display processing program 234, and performs display by hiding a part of the setting history (Step S120), and ends the processing.

1.3 Operation Example

Figure 7:
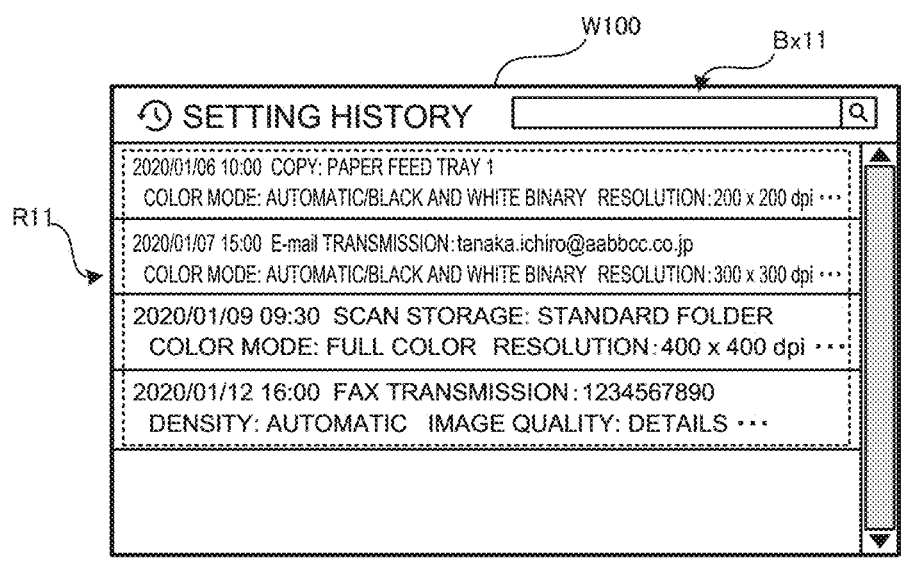
FIG. 7 is a diagram illustrating an operation example according to the first embodiment.

1.3.1 Operation Example of Setting History Display Restriction when Destination is Object to be Protected FIG. 7 is a diagram illustrating an operation example of display restriction of a setting history when a destination is an object to be protected. The present operation example is equivalent to the processing of Step S100 in FIG. 5.

A setting history screen W100 is a screen to be displayed on the display 13 by the controller 11 in response to a display instruction input by the user. The setting history screen W100 is a history screen that displays a setting history based on setting history information pertaining to jobs executed by the multifunction machine 10, for example, in chronological order. The setting history screen W100 includes a setting history display area R11 and a search value input box Bx11.

The setting history display area R11 is a display area that displays a setting history based on setting history information. In the setting history display area R11, a setting history based on setting history information illustrated in FIG. 4 is displayed. For example, a setting history pertaining to a copy job executed at "10:00 on Jan. 6, 2020" in the uppermost row corresponds to setting history information pertaining to a copy job having the job ID (JID) 1 in FIG. 4.

In the setting history display area R11 illustrated in FIG. 7, a setting history pertaining to JID3 of setting history information illustrated in FIG. 4 is not displayed. This is because "tanaka.jiro@aabbcc.co.jp", which is the destination of the e-mail transmission job having JID 3, is not stored in the address book illustrated in FIG. 3, as the "destination number" of "destination name: Jiro Tanaka", and the controller 11 determines that the destination is to be protected. In this case, the controller 11 imposes a display restriction that the setting history is not to be displayed in the setting history display area R11.

The search value input box Bx11 is an input box that accepts an input of a search value by the user, when setting history information is searched. By inputting a desired search value into the search value input box Bx11, the user can search setting history information stored in the setting history information storage area 237.

Figure 8:
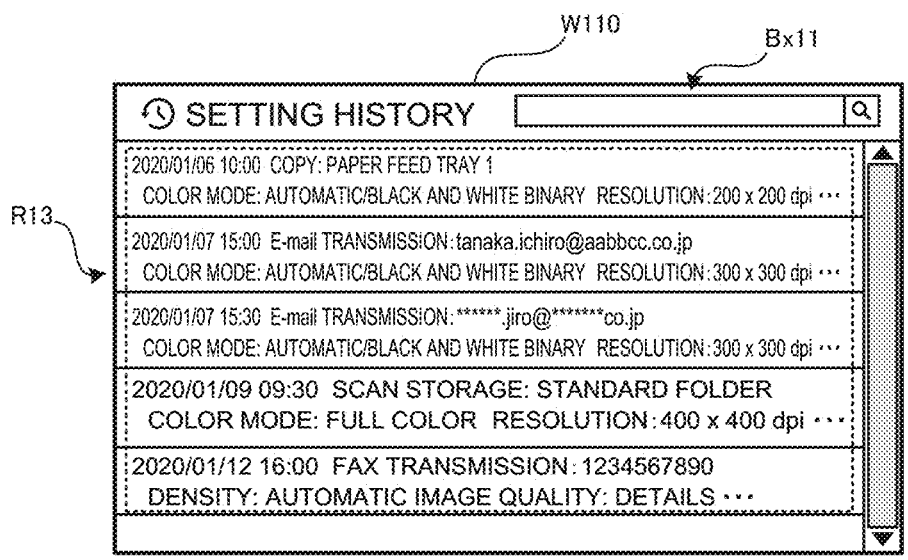
FIG. 8 is a diagram illustrating an operation example according to the first embodiment.

1.3.2 Operation Example of Setting History Hiding when Destination is Object to be Protected FIG. 8 is a diagram illustrating an operation example of hiding a setting history, when a destination is an object to be protected. The present operation example is equivalent to the processing of Step S120 in FIG. 6. Note that, since a setting history screen W110 can have the same configuration as that of the setting history screen W100 illustrated in FIG. 7, a same component is designated with a same reference sign, and description thereof is omitted.

Similarly to the setting history screen W100, the setting history screen W110 is a screen to be displayed on the display 13 by the controller 11 in response to a display instruction input by the user.

In a setting history display area R13 illustrated in FIG. 8, a setting history pertaining to JID3 of setting history information illustrated in FIG. 4 is displayed. However, the destination of e-mail transmission is converted into "****.jiro@****co.jp", and characters other than a designated part of the destination are converted into "k". Thus, a part of the destination is hidden. This is because "tanaka.jiro@aabbcc.co.jp", which is the destination of the e-mail transmission job having JID 3, is not stored in the address book illustrated in FIG. 3, as the "destination number" of "destination name: Jiro Tanaka", and the controller 11 determines that the destination is to be protected. In this case, the controller 11 displays the setting history pertaining to JID 3, but performs hiding processing with respect to a part of the destination for display.

FIG. 8 illustrates an example in which, as hiding processing with respect to a destination, characters other than the five characters at the end of the destination, and characters other than the five characters immediately before @ are converted into "*". However, the number of characters to be hidden is not limited to the above. Further, as hiding processing, for example, a destination may not be displayed (blank display), or all characters of a destination may be converted into predetermined characters/symbols for display, in addition to a configuration in which characters other than a predetermined part of a destination are converted into predetermined characters/symbols or the like.

As described above, according to the first embodiment, it is possible to provide a multifunction machine and the like capable of preventing destination information from being leaked to the outside against an intention of a user, without requiring a special operation to the user, by determining whether a destination included in setting history information is private, specifically, a destination to be protected depending on a registration status of the destination in an address book.

2. Second Embodiment

A multifunction machine according to the second embodiment is configured in such a way that a setting history displayed on a setting history screen is selectable. By allowing a user to select a desired setting history, the user can cause the multifunction machine to execute a job based on setting history information associated with the setting history. At this occasion, the multifunction machine according to the second embodiment is configured to determine whether a destination included in setting history information is a destination to be protected, and determines availability of a selected setting history.

2.1 Functional Configuration

A functional configuration of the multifunction machine according to the second embodiment can be made similar to that of the multifunction machine 10 according to the first embodiment. Therefore, description on the functional configuration according to the second embodiment is omitted herein.

2.2 Flow of Processing

Figure 9:
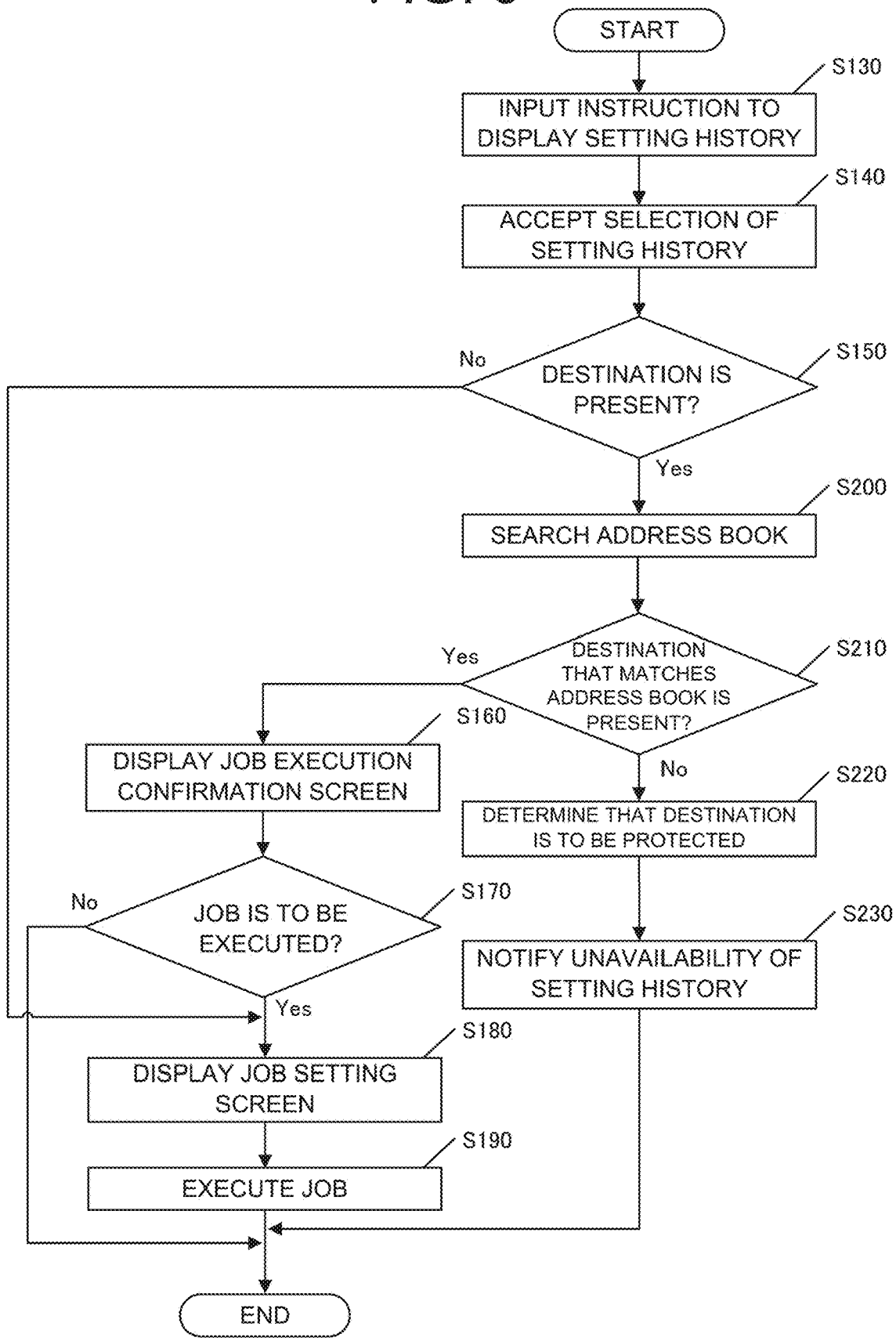
FIG. 9 is a flowchart illustrating a flow of processing according to a second embodiment.

A flow of processing according to the second embodiment is described with reference to a flowchart in FIG. 9. FIG. 9 is a flowchart illustrating processing from a display instruction input of a setting history by a user to job execution or notification of unavailability of a setting history.

First, in response to a display instruction input of a setting history by the user (Step S130), a controller 11 displays, on a display 13, a setting history based on setting history information stored in a setting history information storage area 237.

When the controller 11 accepts selection of a setting history by the user (Step S140), the controller 11 determines whether a destination pertaining to data transmission is present in setting history information pertaining to the accepted setting history (Step S150).

When the controller 11 determines that setting history information including the destination is not present (Step S150; No), a job setting screen is displayed on the display 13 (Step S180).

The user inputs, changes, or confirms a setting value pertaining to execution of a job via the job setting screen. When settings via the job setting screen are completed, the controller 11 executes the job (Step S190), and ends the processing.

On the other hand, when the controller 11 determines that setting history information including the destination is present (Step S150; Yes), the controller 11 performs a search of an address book stored in a destination information storage area 236 (Step S200).

As a result of the search of the address book, it is determined whether destination information that matches the destination is present (Step S210), and, as a result of the determination, when destination information is not present (Step S210; No), the controller 11 determines that the destination included in the setting history information is a destination to be made private, specifically, a destination to be protected (Step S220). Then, the controller 11 notifies the user of unavailability of a setting history (Step S230), and ends the processing.

Note that, as a result of the search of the address book (Step S210), when destination information that matches the destination is present (Step S210; Yes), the controller 11 determines that the destination included in the setting history information is a destination that is allowed to be made public, specifically, a destination that is not an object to be protected.

Then, the controller 11 displays a job execution confirmation screen on the display 13 (Step S160). When job execution by the user is confirmed via the job execution confirmation screen (Step S170; Yes), the controller 11 displays the job setting screen on the display 13 (Step S180).

The user inputs, changes, or confirms a setting value pertaining to execution of a job via the job setting screen. When settings via the job setting screen are completed, the controller 11 executes the job (Step S190), and ends the processing.

2.3 Operation Example

Figures 10A, 10B, 10C:
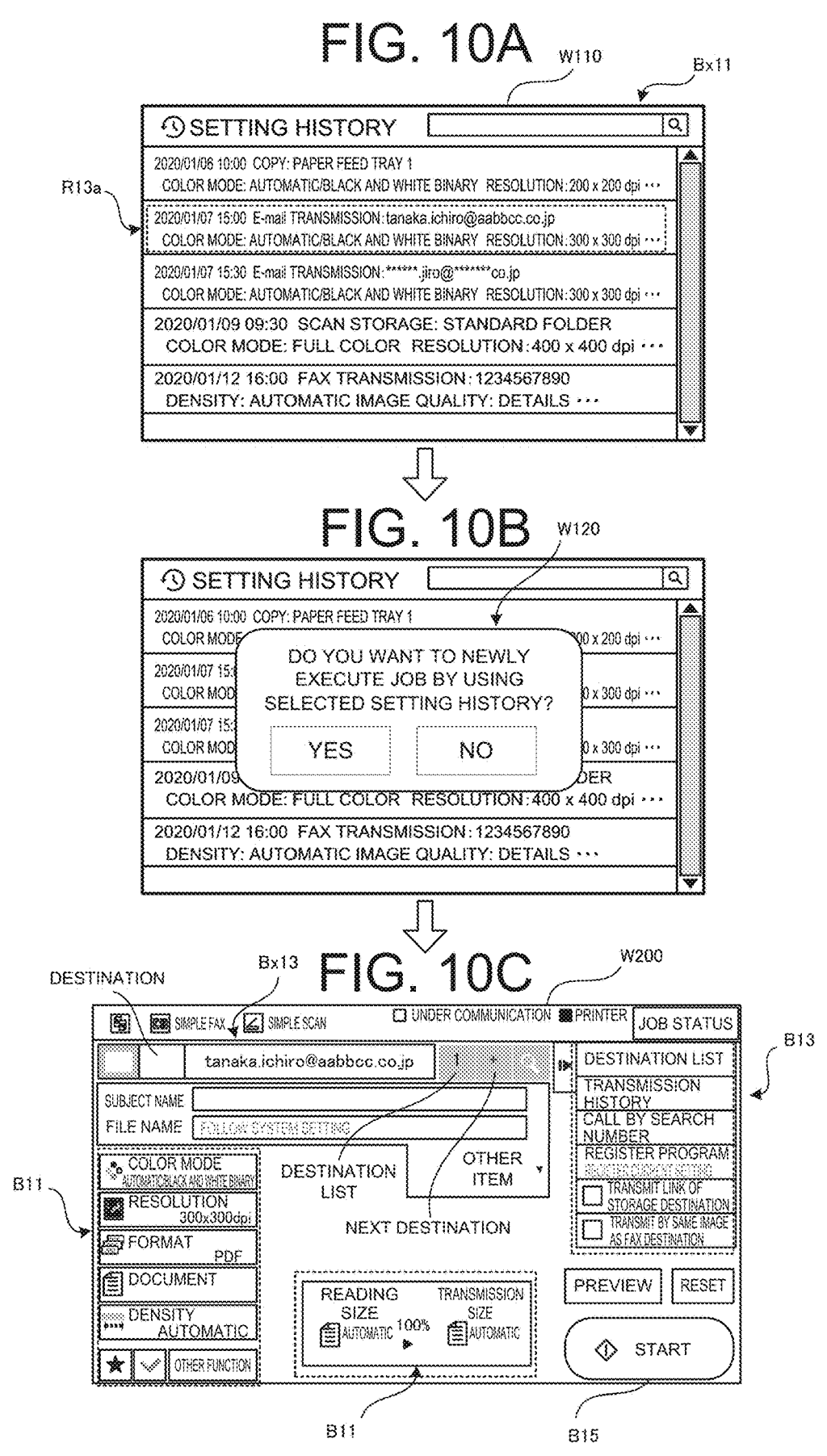

FIGS. 10A to 10C are diagrams illustrating an operation example when a setting history pertaining to setting history information including a destination that is not an object to be protected is selected by the user. The present operation example is equivalent to the processing from Step S130 to Step S180 in FIG. 9.

FIG. 10A illustrates the setting history screen W110 illustrated in FIG. 8. Herein, when a setting history in a setting history display area R13a surrounded by a dotted line frame is selected by the user, the controller 11 performs processing from Step S140 to Step S210.

When destination information that matches a destination is present, as a result of a search of an address book (Step S210 in FIG. 9; Yes), the controller 11 displays a job execution confirmation screen W120 illustrated in FIG. 10B. The job execution confirmation screen W120 presents the user with a message to the effect that "Do you want to newly execute a job by using the selected setting history?". When "Yes" is selected by the user, the controller 11 displays a job setting screen W200 illustrated in FIG. 10C. On the other hand, when "No" is selected by the user, the controller 11 ends the processing.

FIG. 10C is a configuration example of the job setting screen W200. The job setting screen W200 includes a destination input box Bx13, a function setting button B11, a processing selection button B13, and a start button B15.

In the destination input box Bx13, a destination included in setting history information pertaining to a selected setting history is set. FIG. 10C illustrates an example in which "tanaka.ichiro@aabbcc.co.jp" is set as a destination.

In the function setting button B11, each setting value included in setting history information pertaining to a selected setting history is reflected and displayed. The function setting button B11 is configured in such a way that the setting value can be changed in response to being pressed by the user. For example, when the user wants to change the color mode from "black and white binary" to "full color", the user is allowed to press the function setting button B11 associated with a setting item of the color mode, and change the color mode from "black and white binary" to "full color" via an unillustrated displayed change screen. Note that, a setting value item associated with a job function to be executed (in the present operation example, an e-mail transmission function) is preferentially displayed in the function setting button B11.

The processing selection button B13 is an input button that accepts selection of processing desired by a user. For example, when the user wants to change a destination set in the destination input box Bx13, the user presses "destination list" in the processing selection button B13. Then, the controller 11 displays the e-mail address, which is destination information stored in the destination information storage area 236. The user can change the e-mail address set in the destination input box Bx13 by selecting a desired e-mail address.

The start button B15 is an input button that accepts pressing by the user, when a job is executed based on a setting content set in the job setting screen W200. The controller 11 executes a job in response to pressing of the start button B15.

Figure 11A:
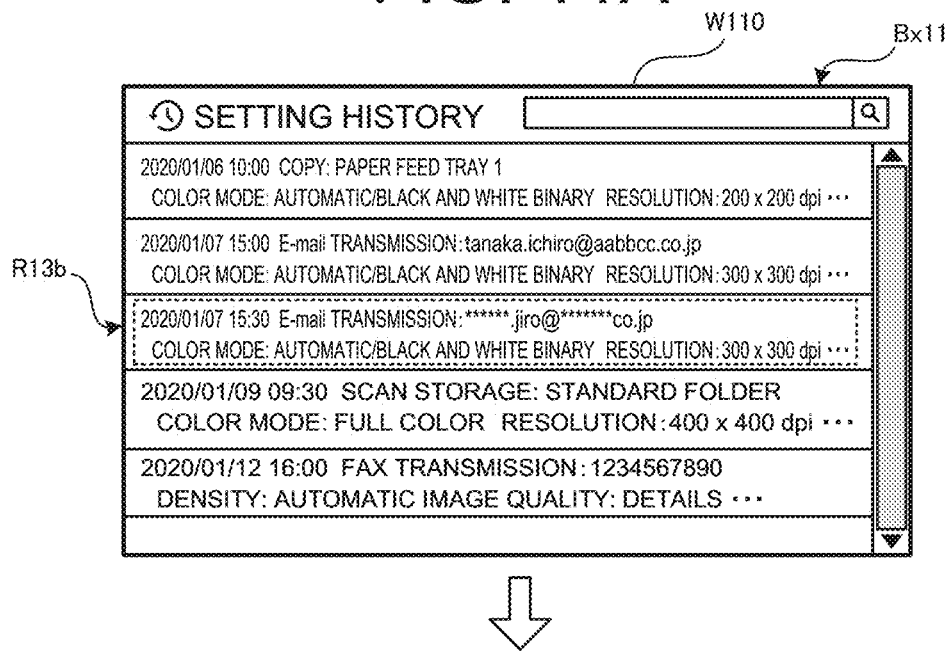
FIGS. 11A and 11B are diagrams illustrating an operation example according to the second embodiment.
Figure 11B:
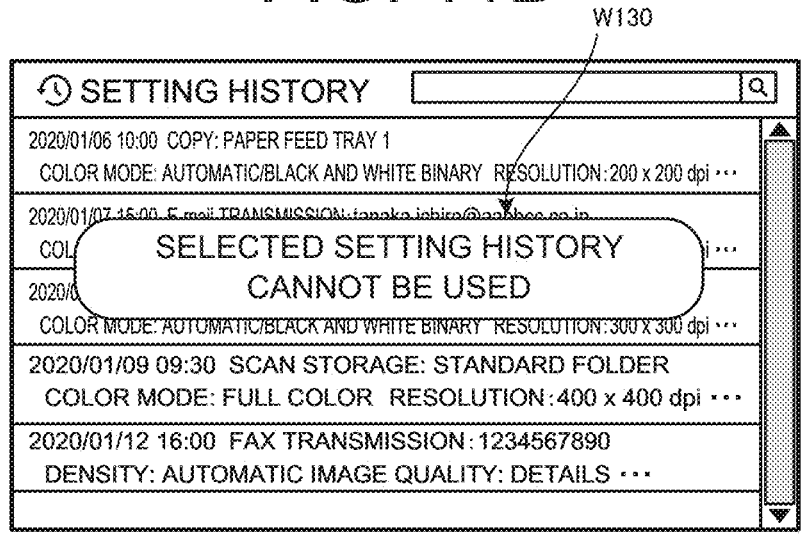

FIGS. 11A and 11B are diagrams illustrating an operation example pertaining to notification of unavailability of a setting history when a setting history including a destination to be protected is selected by a user. The present operation example is equivalent to the processing from Step S130 to Step S230 in FIG. 9.

FIG. 11A illustrates the setting history screen W110 illustrated in FIG. 8. Herein, when a setting history in a setting history display area R13b surrounded by a dotted line frame is selected by the user, the controller 11 performs processing from Step S140 to Step S210.

When destination information that matches a destination is not present, as a result of a search of an address book (Step S210 in FIG. 9; No), the controller 11 displays a setting history unavailable screen W130 illustrated in FIG. 11B. The setting history unavailable screen W130 presents the user with a message to the effect that "the selected setting history cannot be used". Note that, as a means for notifying unavailability of a setting history, for example, a means for outputting a beep sound that alerts the user of unavailability may be employed, in addition to message presentation. When unavailability of a setting history is notified, the controller 11 does not make a transition to a job setting screen.

As described above, according to the second embodiment, it is possible to provide a multifunction machine and the like in which it is determined whether a destination included in setting history information is a destination to be protected, and it is determined whether a selected setting history is available.

3. Third Embodiment

A multifunction machine according to the third embodiment has a configuration, in the multifunction machine according to the second embodiment, in which a job setting screen that reflects a setting value other than a destination is presented to a user, in place of a configuration in which unavailability of a setting history is notified, when a destination included in setting history information is a destination to be protected.

3.1 Functional Configuration

A functional configuration of the multifunction machine according to the third embodiment can be made similar to that of the multifunction machine 10 according to the first and second embodiments. Therefore, description on the functional configuration according to the third embodiment is omitted herein.

3.2 Flow of Processing

Figure 12:
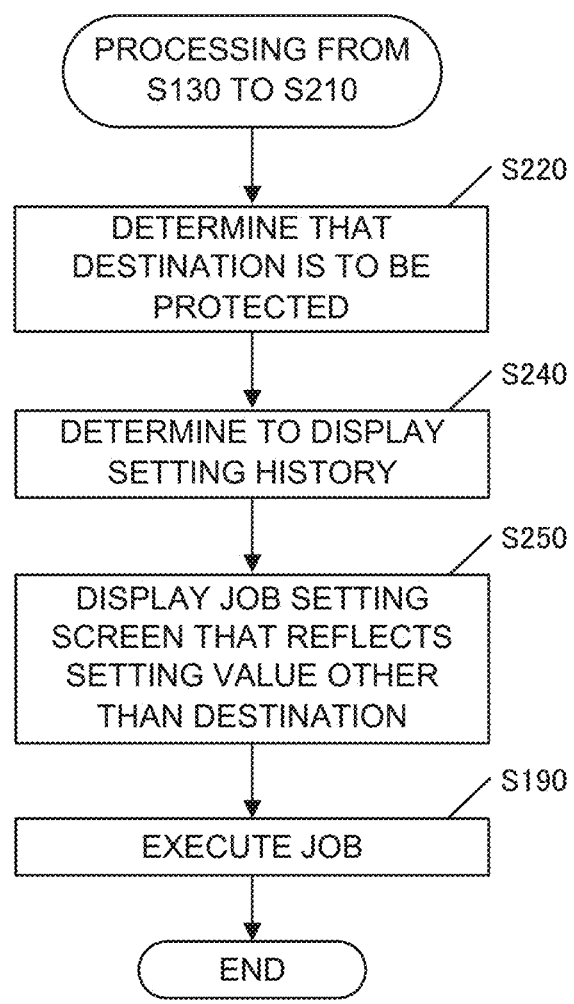
FIG. 12 is a flowchart illustrating a flow of processing according to a third embodiment.

A flow of processing according to the third embodiment is described with reference to a flowchart in FIG. 12. FIG. 12 illustrates processing of Step S220 and thereafter in FIG. 9. Since processing from Step S130 to Step S210 can be made the same as the processing of the flowchart in FIG. 9, description thereof is omitted herein.

When a controller 11 determines that a destination included in setting history information is a destination to be made private, specifically, a destination to be protected (Step S220), the controller 11 determines that a part of a setting history is to be displayed (Step S240). Next, the controller displays a job setting screen that reflects a setting value of the setting history information other than the destination (Step S250).

The user inputs, changes, or confirms a setting value pertaining to execution of a job via the job setting screen. When settings via the job setting screen are completed, the controller 11 performs the job (Step S190), and ends the processing.

3.3 Operation Example

FIG. 13A to 13C are diagrams illustrating an operation example in which a job setting screen that reflects a setting value other than a destination is presented to the user, when setting history information including the destination to be protected is selected by the user. The present operation example is equivalent to the processing from Step S130 to Step S210 in FIG. 9 and from Step S220 to Step S190 in FIG. 12.

FIG. 13A illustrates the setting history screen W110 illustrated in FIG. 8. Herein, when a setting history in a setting history display area R13b surrounded by a dotted line frame is selected by the user, the controller 11 performs processing from Step S140 to Step S210.

When destination information that matches a destination is not present (Step S210 of FIG. 9; No), the controller 11 presents a job execution confirmation screen W120 illustrated in FIG. 13B. The job execution confirmation screen W120 presents the user with a message to the effect that "Do you want to newly execute a job by using the selected setting history?". When "Yes" is selected by the user, the controller 11 displays a job setting screen W210 illustrated in FIG. 13C. On the other hand, when "No" is selected by the user, the controller 11 ends the processing.

FIG. 13C is a configuration example of the job setting screen W210. The job setting screen W210 has the same configuration as that of the job setting screen W200. The controller 11 displays the job setting screen W210 in a state that a destination input box Bx13 is made blank. At this occasion, the controller 11 reflects and displays, in a function setting button B11, a setting value included in setting history information pertaining to a setting history selected by the user.

As described above, according to the third embodiment, it is possible to provide a multifunction machine and the like in which a job setting screen that reflects a setting value other than a destination is presented to a user, when the destination included in setting history information is a destination to be protected.

4. Fourth Embodiment

A multifunction machine according to the fourth embodiment has a configuration, in the multifunction machine according to the first to third embodiments, in which a job is executed by using a search result on setting history information via a setting history screen.

4.1 Functional Configuration

A functional configuration of the multifunction machine according to the fourth embodiment can be made similar to that of the multifunction machine according to the first to third embodiments. Therefore, description on the functional configuration according to the fourth embodiment is omitted herein.

4.2 Flow of Processing

Figure 14:
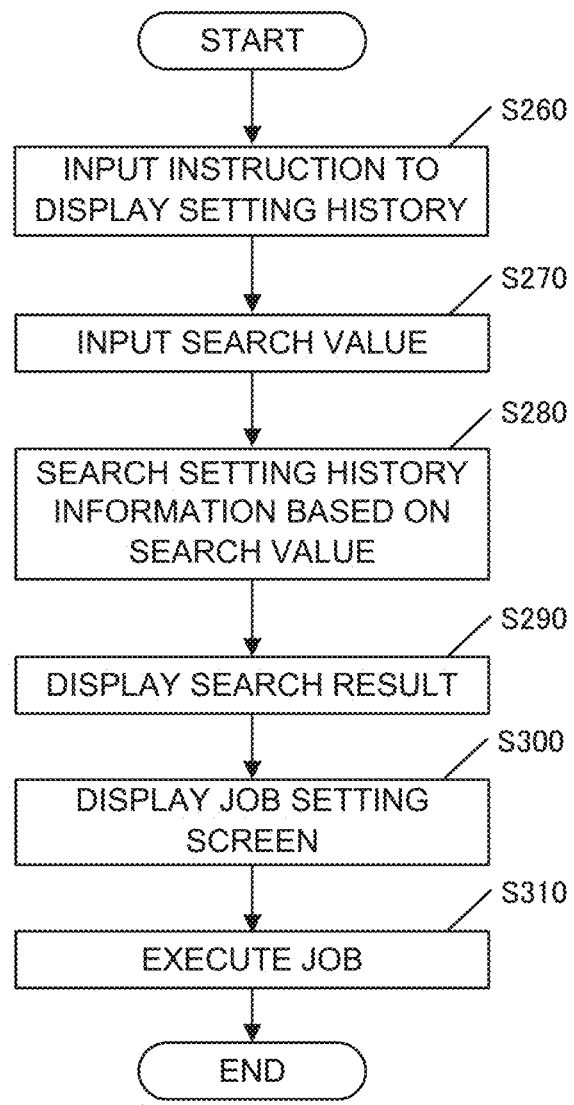
FIG. 14 is a flowchart illustrating a flow of processing according to a fourth embodiment.

A flow of processing according to the fourth embodiment is described with reference to a flowchart in FIG. 14.

First, in response to a display instruction input of a setting history by a user (Step S260), a controller 11 displays, on a display 13, a setting history based on setting history information stored in a setting history information storage area 237.

When the controller 11 accepts an input of a search value by the user (Step S270), the controller 11 performs a search of setting history information, based on the accepted search value (Step S280).

Then, the controller 11 displays a setting history based on setting history information including the search value accepted as a search result (Step S290). When a desired setting history is selected by the user, the controller 11 displays a job setting screen that reflects a setting value included in setting history information pertaining to the setting history (Step S300).

The user inputs, changes, or confirms a setting value pertaining to execution of a job via the job setting screen. When settings via the job setting screen are completed, the controller 11 executes the job (Step S310), and ends the processing.

4.3 Operation Example

FIGS. 15A to 15C are diagrams illustrating an operation example pertaining to job execution using a search result of setting history information. The present operation example is equivalent to the processing from Step S260 to Step S310 in FIG. 14.

FIG. 15A illustrates the setting history screen W100 illustrated in FIG. 7. Herein, when the user inputs the e-mail address "tanaka.jiro@aabbcc.co.jp" as a search value into a search value input box Bx11, the controller 11 performs processing from Step S270 to Step S280 in FIG. 14.

FIG. 15B is an example in which an example of a search result is displayed on a setting history screen. A setting history screen W140 includes a search result display area R15. The controller 11 displays, in the search result display area R15, a setting history based on setting history information including a search value. The example in FIG. 15B is an example in which a setting history pertaining to an e-mail transmission job including the e-mail address "tanaka.jiro@aabbcc.co.jp" is displayed as a search result.

When a setting history displayed as a search result is selected by the user, the controller 11 displays a job setting screen that reflects a setting value of setting history information pertaining to the setting history. FIG. 15C is a configuration example of a job setting screen W220 in which a setting value pertaining to the setting history selected in FIG. 15B is reflected.

The job setting screen W220 can have the same configuration as that of the job setting screen W200 illustrated in FIGS. 10A to 10C. A destination of setting history information pertaining to the setting history selected in FIG. 15B is reflected and displayed in a destination input box Bx13 of the job setting screen W220.

Then, the controller 11 executes a job in response to pressing of a start button B15 by the user.

As described above, according to the fourth embodiment, it is possible to provide a multifunction machine and the like capable of executing a job by using a search result of setting history information via a setting history screen.

5. Fifth Embodiment

A multifunction machine according to the fifth embodiment has a configuration, in the multifunction machine according to the first to third embodiments, in which a job is executed by using a search result of setting history information via a job setting screen.

5.1 Functional Configuration

A functional configuration of the multifunction machine according to the fifth embodiment can be made similar to that of the multifunction machine according to the first to third embodiments. Therefore, description on the functional configuration according to the fifth embodiment is omitted herein.

5.2 Flow of Processing

A flow of processing according to the fifth embodiment is described with reference to a flowchart in FIG. 16. Note that, processing other than Step S320 in FIG. 16 can be performed in the same manner as the processing (from Step S270 to Step S310) described in the fourth embodiment with reference to FIG. 14. Therefore, only the processing of Step S320 is described herein.

In Step S320, a controller 11 displays a job setting screen, based on a job execution instruction input or the like. In response to an input of a destination (search value) by a user into a destination input box on the job setting screen (Step S270), the controller 11 performs search processing of Step S280 and thereafter.

5.3 Operation Example

Figure 17:
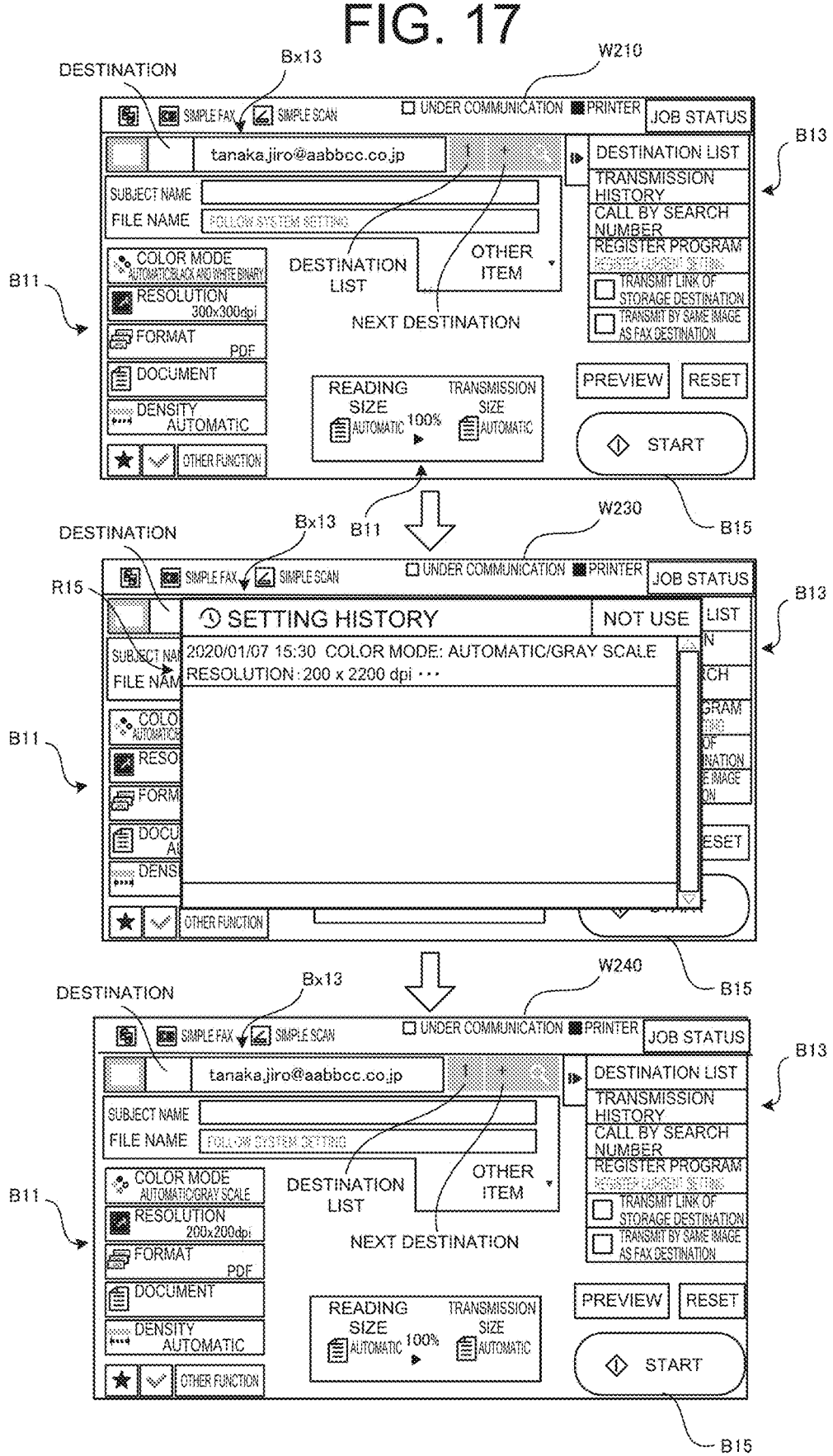
FIG. 17 is a diagram illustrating an operation example according to the fifth embodiment.

FIGS. 17A to 17C are diagrams illustrating an operation example pertaining to job execution using a search result of setting history information. The present operation example is equivalent to the processing from Step S320 to Step S310 in FIG. 16.

FIG. 17A illustrates the job setting screen W210 illustrated in FIG. 13C. Herein, when the user inputs the e-mail address "tanaka.jiro@aabbcc.co.jp" as a search value into a destination input box Bx13, the controller 11 performs processing from Step S270 to Step S280 in FIG. 16.

FIG. 17B is an example in which an example of a search result is displayed on a job setting screen. A job setting screen W230 includes a search result display area R15. The controller 11 displays, in the search result display area R15, a setting history based on setting history information including a search value. The example in FIG. 17B is an example in which a setting history pertaining to an e-mail transmission job including the e-mail address "tanaka.jiro@aabbcc.co.jp" is displayed as a search result.

When a setting history displayed as a search result is selected by the user, the controller 11 displays a job setting screen that reflects a setting value included in setting history information pertaining to the setting history. FIG. 17C is a configuration example of a job setting screen W240 in which a setting value pertaining to the setting history selected in FIG. 17B is reflected.

The job setting screen W240 can have the same configuration as that of the job setting screen W220 illustrated in FIG. 15C. A destination included in setting history information pertaining to the setting history selected in FIG. 17B is reflected and displayed in the destination input box Bx13 on the job setting screen W240.

The controller 11 executes a job in response to pressing of a start button B15 by the user.

As described above, according to the fifth embodiment, it is possible to provide a multifunction machine and the like capable of executing a job by using a search result of setting history information via a job setting screen.

The present invention is not limited to the above-described embodiments, and various changes are available. Specifically, embodiments to be acquired by appropriately combining modified technical means within a range that does not depart from the gist of the present invention are also included in the technical scope of the present invention.

In addition, although some of the above-described embodiments are described separately for convenience of explanation, it is needless to say that it is possible to combine and implement the embodiments within a technically possible range.

In addition, a program operating in each apparatus in the embodiments is a program (a program causing a computer to function) that controls a CPU or the like in such a way as to achieve functions of the above-described embodiments. Information to be handled by these apparatuses is temporarily stored in a temporary storage device (e.g., RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disk (BD), and the like), a magnetic recording medium (e.g., a magnetic tape, a flexible disk, and the like), and the like. In addition, not only functions of the above-described embodiments are achieved by executing a loaded program, but also functions of the present invention may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present invention.

What is claimed is:

1. An information processing apparatus comprising:
a controller that executes a job associated with a setting value that includes a first destination;
a storage; and
a display, wherein
the storage stores destination information including at least one destination, and setting history information that includes the setting value and comprises history information pertaining to execution of the job, and
the controller reads the setting history information from the storage, and controls display of the setting history information on the display based on whether the destination information includes the first destination.

2. The information processing apparatus according to claim 1, wherein
the controller restricts display of the setting history information when the destination information does not include the first destination.

3. The information processing apparatus according to claim 1, wherein
the controller performs display of the setting history information by hiding a part or all of the first destination when the destination information does not include the first destination.

4. The information processing apparatus according to claim 1, wherein
the controller accepts a user selection of the setting history information displayed on the display.

5. The information processing apparatus according to claim 4, wherein
the controller executes the job, based on the selected setting history information, when the destination information includes the first destination.

6. The information processing apparatus according to claim 4, wherein
the controller notifies a user of unavailability of the selected setting history information for executing the job when the destination information does not include the first destination.

7. The information processing apparatus according to claim 4, wherein the controller applies the setting value other than the first destination for executing the job based on the selected setting history informational when the destination information does not include the first destination.

8. The information processing apparatus according to claim 1, wherein
the controller searches the setting history information based on the first destination, and displays the setting history information regardless of whether the destination information includes the first destination.

9. The information processing apparatus according to claim 1, wherein
the display is capable of displaying a setting screen pertaining to execution of the job, and
in response to accepting an input of the first destination via the setting screen, the controller searches the setting history information based on the first destination, and displays the setting value on the display regardless of whether the destination information includes the first destination.

10. A control method for controlling an information processing apparatus provided with a storage, a display, and a controller that executes a job associated with a setting value that includes a first destination, the control method comprising:

storing, in the storage, destination information including at least one destination, and setting history information that includes the setting value and comprises history information pertaining to execution of the job; and reading the setting history information from the storage, and controlling display of the setting history information on the display based on whether the destination information includes the first destination.

11. The information processing apparatus according to claim 1, wherein the controller imposes a display restriction that the setting history information is not to be displayed when the destination information does not include the first destination.

\* \* \* \* \*